United States Patent
Baird et al.

(10) Patent No.: US 11,019,073 B2
(45) Date of Patent: May 25, 2021

(54) APPLICATION-AGNOSTIC RESOURCE ACCESS CONTROL

(71) Applicant: AtScale, Inc., San Mateo, CA (US)

(72) Inventors: Matthew Baird, Belmont, CA (US); David Vigdor Schreibman, San Francisco, CA (US); Gaurav Nitin Shetti, Mumbai (IN)

(73) Assignee: AtScale, Inc., San Mateo, CA (US)

( * ) Notice: Subject to any disclaimer, the term of this patent is extended or adjusted under 35 U.S.C. 154(b) by 233 days.

(21) Appl. No.: 15/913,906

(22) Filed: Mar. 6, 2018

(65) Prior Publication Data
US 2019/0028485 A1    Jan. 24, 2019

Related U.S. Application Data

(60) Provisional application No. 62/535,957, filed on Jul. 23, 2017.

(51) Int. Cl.
*H04L 29/06* (2006.01)
*H04L 29/08* (2006.01)

(52) U.S. Cl.
CPC .......... *H04L 63/108* (2013.01); *H04L 63/083* (2013.01); *H04L 63/0807* (2013.01); *H04L 63/0815* (2013.01); *H04L 67/146* (2013.01)

(58) Field of Classification Search
CPC .............. H04L 63/108; H04L 63/0807; H04L 63/0815; H04L 63/083; H04L 67/146
See application file for complete search history.

(56) References Cited

U.S. PATENT DOCUMENTS

| | | |
|---|---|---|
| 6,236,997 B1 | 5/2001 | Bodamer et al. |
| 6,308,178 B1 | 10/2001 | Chang et al. |
| 7,668,878 B2 | 2/2010 | Arora et al. |
| 7,689,582 B2 | 3/2010 | Behnen et al. |
| 8,041,670 B2 | 10/2011 | Bakalash |

(Continued)

OTHER PUBLICATIONS

K. Benedyczak, B. Schuller, M. Petrova-El Sayed, J. Rybicki and R. Grunzke, "UNICORE 7—Middleware services for distributed and federated computing," 2016 International Conference on High Performance Computing & Simulation (HPCS), Innsbruck, 2016, pp. 613-620. (Year: 2016).*

(Continued)

*Primary Examiner* — Robert B Leung
*Assistant Examiner* — Sameera Wickramasuriya
(74) *Attorney, Agent, or Firm* — Armis IP Law, LLC

(57) ABSTRACT

Techniques are presented for efficiently provisioning application-agnostic resource access to a variety of applications without modification to the native access control mechanisms of the applications and without transmission of a user's credentials over the network. A user of an application is authenticated by an authorization provider. An access token for the authenticated user is generated. A session password is generated based at least in part on the access token. The session password is applied by the user to the native access control mechanism of an application to facilitate access to resources (e.g., set of subject data) by the application. The resource access is achieved without modification to the native access control mechanism of the application and without transmission of the credentials (e.g., username, password, etc.) of the user over the network.

25 Claims, 13 Drawing Sheets

(56) References Cited

U.S. PATENT DOCUMENTS

| | | | |
|---|---|---|---|
| 8,209,744 B2* | 6/2012 | Zhu | G06Q 10/02 380/44 |
| 8,499,153 B2* | 7/2013 | Ritola | H04L 63/0815 713/168 |
| 9,769,122 B2* | 9/2017 | Winner | H04L 63/0421 |
| 9,813,400 B2* | 11/2017 | Ross | H04L 63/08 |
| 9,985,786 B1* | 5/2018 | Bhabbur | G09C 5/00 |
| 2002/0038348 A1 | 3/2002 | Malone | |
| 2004/0255137 A1* | 12/2004 | Ying | H04L 63/0442 713/193 |
| 2007/0028108 A1 | 2/2007 | Cowburn | |
| 2007/0113076 A1 | 5/2007 | Cowburn | |
| 2010/0125565 A1 | 5/2010 | Burger | |
| 2011/0154465 A1* | 6/2011 | Kuzin | H04L 63/0815 726/9 |
| 2011/0239283 A1* | 9/2011 | Chern | G06F 21/33 726/6 |
| 2013/0054803 A1* | 2/2013 | Shepard | H04L 63/083 709/225 |
| 2015/0089621 A1* | 3/2015 | Khalid | H04L 63/08 726/9 |
| 2015/0180857 A1* | 6/2015 | Schulman | H04L 63/0807 726/9 |
| 2015/0332029 A1* | 11/2015 | Coxe | H04L 63/0815 726/9 |
| 2016/0098037 A1 | 4/2016 | Zornio | |
| 2016/0098448 A1 | 4/2016 | McShane | |
| 2016/0127454 A1* | 5/2016 | Maheshwari | H04L 47/70 709/223 |
| 2016/0314173 A1 | 10/2016 | Lydick | |
| 2016/0337321 A1* | 11/2016 | Lin | H04L 63/0428 |
| 2017/0091470 A1 | 3/2017 | Infante-Lopez | |
| 2017/0103105 A1 | 4/2017 | Barsness | |
| 2017/0187708 A1* | 6/2017 | Moore | H04L 63/0838 |
| 2017/0235786 A9 | 8/2017 | Faith | |
| 2017/0289197 A1* | 10/2017 | Mandyam | H04L 63/06 |
| 2017/0364553 A1* | 12/2017 | Jacob | G06F 16/242 |
| 2018/0176221 A1* | 6/2018 | Zhou | H04L 63/0884 |

OTHER PUBLICATIONS

L. O'Gorman, "Comparing passwords, tokens, and biometrics for user authentication," in Proceedings of the IEEE, vol. 91, No. 12, pp. 2021-2040, Dec. 2003, doi: 10.1109/JPROC.2003.819611. (Year: 2003).*

Kahani, Nafiseh, Khalid Elgazzar, and James R. Cordy. "Authentication and access control in e-health systems in the cloud." 2016 IEEE 2nd International Conference on Big Data Security on Cloud (BigDataSecurity), IEEE, 2016. (Year: 2016).* https://451research.com/report-short?entityId=92407, 451 Research Impact Report, "Kyvos adds SQL support, availability on Google Cloud for OLAP-on-Hadoop" May 8, 2017, 1 page.

https://www.slideshare.net/AtulSharma225/kyvos-insights-datasheet-60646546 "Kyvos insights", Apr. 8, 2016, 2 pages.

International Preliminary Report & Written Opinion of PCT Application No. PCT/US2015/0022082, dated Jun. 25, 2015, 3 pages total.

International Search Report & Written Opinion of PCT Application No. PCT/US2016/031684, dated Oct. 19, 2016, 6 pages total.

https://www.ibm.com/support/knowledgecenter/en/ssw_i5_54/rzajq/rzajqdispatcher.htm, "Query Dispatcher", downloaded May 2, 2017, 1 page.

Data Structures for Databases, Jan. 1, 2001, Hammer, Joachim, 24 pages.

Oauth_2_Framework_rfc6749, Oct. 2012, Hardt, Ed., 76 pages.

* cited by examiner

APPLICATION-AGNOSTIC RESOURCE ACCESS CONTROL

RELATED APPLICATIONS

The present application claims the benefit of priority to Provisional U.S. Patent Application Ser. No. 62/535,957, entitled "APPLICATION-AGNOSTIC RESOURCE ACCESS CONTROL", filed 23 Jul. 2017, which is hereby incorporated by reference in its entirety.

FIELD

This disclosure relates to data analytics, and more particularly to techniques for application-agnostic resource access control.

BACKGROUND

Many enterprises today manage large volumes of data that are accessed by various users for various purposes. A financial analyst at an enterprise might interact with a business intelligence ("BI") application (e.g., Excel, Tableau, etc.) to access various portions of the data (e.g., business intelligence information) to generate a quarterly financial report, while a marketing manager might use a different BI application to access another portion of the data (e.g., other business intelligence information) to discover product sales trends. In some cases, the enterprise might authorize access to the data by a third party that is external to the enterprise.

As an example, a large retailer might authorize an external product supplier to access a particular portion of the data to efficiently manage the inventory of the products shipped from the supplier. This external user might use yet another application to access the data. When the corpus of data is stored on the enterprise's internal network (e.g., inside a firewall), the enterprise is compelled to provide some form of remote access to such third parties. For example, the enterprise might provide virtual private network ("VPN") access for the third-party users. As the resource owner of the data, the enterprise will establish user authentication and/or authorization mechanisms for accessing the data resource.

As the number of users accessing the data increases, the security concerns and/or user management challenges also increase for the enterprise. In response to such security concerns and/or user management challenges, many enterprises are migrating their data to cloud storage platforms. As such, the burden of securely authenticating and authorizing the users is transferred to the cloud storage provider. The resource owner might further specify that their resources (e.g., data) are accessed at the cloud storage provider using a shared application-agnostic access control mechanism that does not transfer authentication credentials over the public network.

Unfortunately, the native resource access capabilities of the applications (e.g., BI applications) used to access the cloud-based data do not support such an access control mechanism. Rather, many applications implement an access control mechanism that calls for user credentials (e.g., username and password) to be entered at the application to facilitate a connection to a target resource (e.g., data, service, etc.). In this case, the user credentials are transmitted over the network to a resource server (e.g., cloud-based content server) to establish access to the target resource, thereby conflicting with at least one of the foregoing requirements of the resource owner. As another legacy approach, all applications that might be used to access the target resource are updated to include the aforementioned shared application-agnostic access control mechanism. However, such an approach consumes substantial time and development resources. Further, in most cases, such an approach would include authentication of users on the application side (e.g., client side), consuming additional development and computing resources.

What is needed is a technological solution for efficiently provisioning resource access to a variety of applications without modification to the native access control mechanisms of the applications and/or without transmission of user credentials over the network. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure describes techniques used in systems, methods, and in computer program products for application-agnostic resource access control, which techniques advance the relevant technologies to address technological issues with legacy approaches. More specifically, the present disclosure describes techniques used in systems, methods, and in computer program products for secure access to resources by a plurality of applications using the native access control mechanisms of the applications. Certain embodiments are directed to technological solutions for generating session passwords for authenticated users that are applied to the native access control mechanisms of the users' applications to facilitate resource access.

The disclosed embodiments modify and improve over legacy approaches. In particular, the herein-disclosed techniques provide technical solutions that address the technical problems attendant to efficiently provisioning resource access to a variety of applications without modification to the native access control mechanisms of the applications and/or without transmission of user credentials over the network. Such technical solutions relate to improvements in computer functionality and computer security. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of business intelligence systems as well as advances in various technical fields related to access control when performing data analytics.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
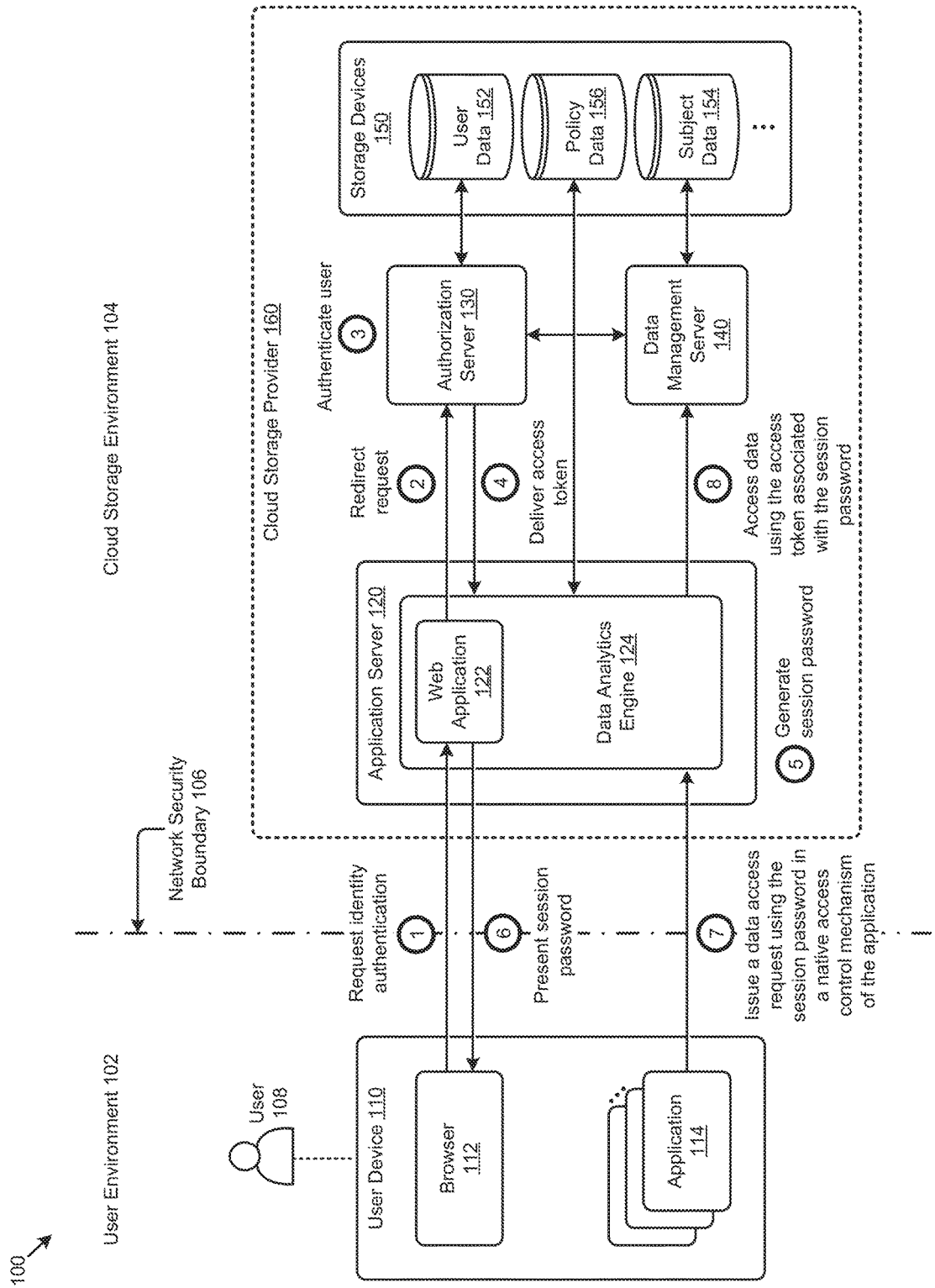
FIG. 1 illustrates a computing environment in which embodiments of the present disclosure can be implemented.

Embodiments in accordance with the present disclosure address the problem of efficiently provisioning resource access to a variety of applications without modification to the native access control mechanisms of the applications or without transmission of user credentials over the network. Some embodiments are directed to approaches for generating session passwords for authenticated users that are applied to the native access control mechanisms of the users' applications to facilitate resource access. The accompanying figures and discussions herein present example environments, systems, methods, and computer program products for secure access to resources by a plurality of applications using the native access control mechanisms of the applications.

Overview

Disclosed herein are techniques for generating a session password for an authenticated user that is applied to the native access control mechanism of one or more of the user's applications to facilitate resource access by the applications.

In certain embodiments, the user is authenticated by an authorization provider. An access token for the authenticated user is generated. A session password is generated based at least in part on the access token. The session password is applied by the user to the native access control mechanism of an application to facilitate the resource access. In certain embodiments, the access token associated with the session password received from the native access control mechanism is checked one or more times before resource access is provisioned. In certain embodiments, the issued access tokens are periodically checked for validity.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

As shown, the computing environment 100 is partitioned into a user environment 102 and a cloud storage environment 104. The shown environments represent any two environments separated by a network security boundary 106 (e.g., a firewall). Other environments, partitionings and/or descriptions are possible. The user environment 102 comprises a user 108 with access to a user device 110 (e.g., a desktop computer, a laptop computer, a workstation, a smart phone, etc.). A browser 112 and a plurality of applications (e.g., BI applications, data analysis tools, etc.), such as instances of application 114, can be operated on user device 110.

The cloud storage environment 104 can comprise various components that are under the operation and/or control of a cloud storage provider 160. As can observed in the computing environment 100, the cloud storage provider might operate and/or control an application server 120, an authorization server 130, and a data management server 140. Any of the foregoing servers and/or other computing elements can have access to a set of storage devices 150 (e.g., in a storage pool), that might include a set of user data 152, a set of subject data 154, a set of policy data 156, and/or other electronically stored data objects. As further shown in the example embodiment of FIG. 1, a data analytics engine 124 comprising a web application 122 can be implemented at application server 120.

The components in computing environment 100 can interact to carry out the herein disclosed techniques as follows. An identity authentication request can be sent from browser 112 to web application 122 (operation 1). For example, web application 122 might present a user interface to user 108 in browser 112 to facilitate submission of the identity authentication request. The user authentication request is redirected by web application 122 to authorization server 130 of cloud storage provider 160 (operation 2). As an example, cloud storage provider 160 (e.g., Google BigQuery) might perform identity provider ("IdP") services or identity assertion provider services (e.g., Google Cloud Identity and Access Management). In this case, the resource owner of subject data 154 can provide user profile information that is stored in user data 152 to identify the users that the resource owner is authorizing to access subject data 154. Authorization server 130 accesses user data 152 to authenticate user 108 (operation 3).

An access token associated with the authenticated user (e.g., user 108) is received from authorization server 130 at data analytics engine 124 (operation 4). Data analytics engine 124 generates a session password based at least in part on the access token (operation 5). For example, the session password might be a random hash value (e.g., SHA-256 hash value) derived from one or more of the attributes of the access token. In other cases, the session password might comprise a randomly generated sequence of characters, where the number of characters in the sequence is selectable (e.g., by a system administrator). As can be observed, data analytics engine 124 might access policy data 156 (e.g., policy data associated with the authenticated user) to determine whether a session password can be generated for the user and/or the attributes (e.g., session permissions, etc.) of the generated session password. Web application 122 of data analytics engine 124 then presents the session password to user 108 (operation 6) in a user interface at browser 112 of user device 110.

User 108 can issue a data access request to data analytics engine 124 by exposing the session password to the native access control mechanism of application 114 (operation 7). For example, user 108 might enter the session password in a password text field of a native connection wizard presented by a particular application (e.g., Microsoft Excel). An access control mechanism of an application is characterized as "native" when the mechanism is not modified to accommodate the session password and/or is not modified to accommodate interfacing with any of the herein disclosed techniques.

Data analytics engine 124 can then access subject data 154 by issuing one or more data operations with the access token associated with the session password to data management server 140 (operation 8). The foregoing operations facilitated by the herein disclosed techniques efficiently provision access to subject data 154 by application 114 without modification to the native access control mechanisms of application 114 or without transmission of the credentials of user 108 over the network security boundary 106. One embodiment of the foregoing steps and/or operations is presented in detail as follows.

Figure 2:
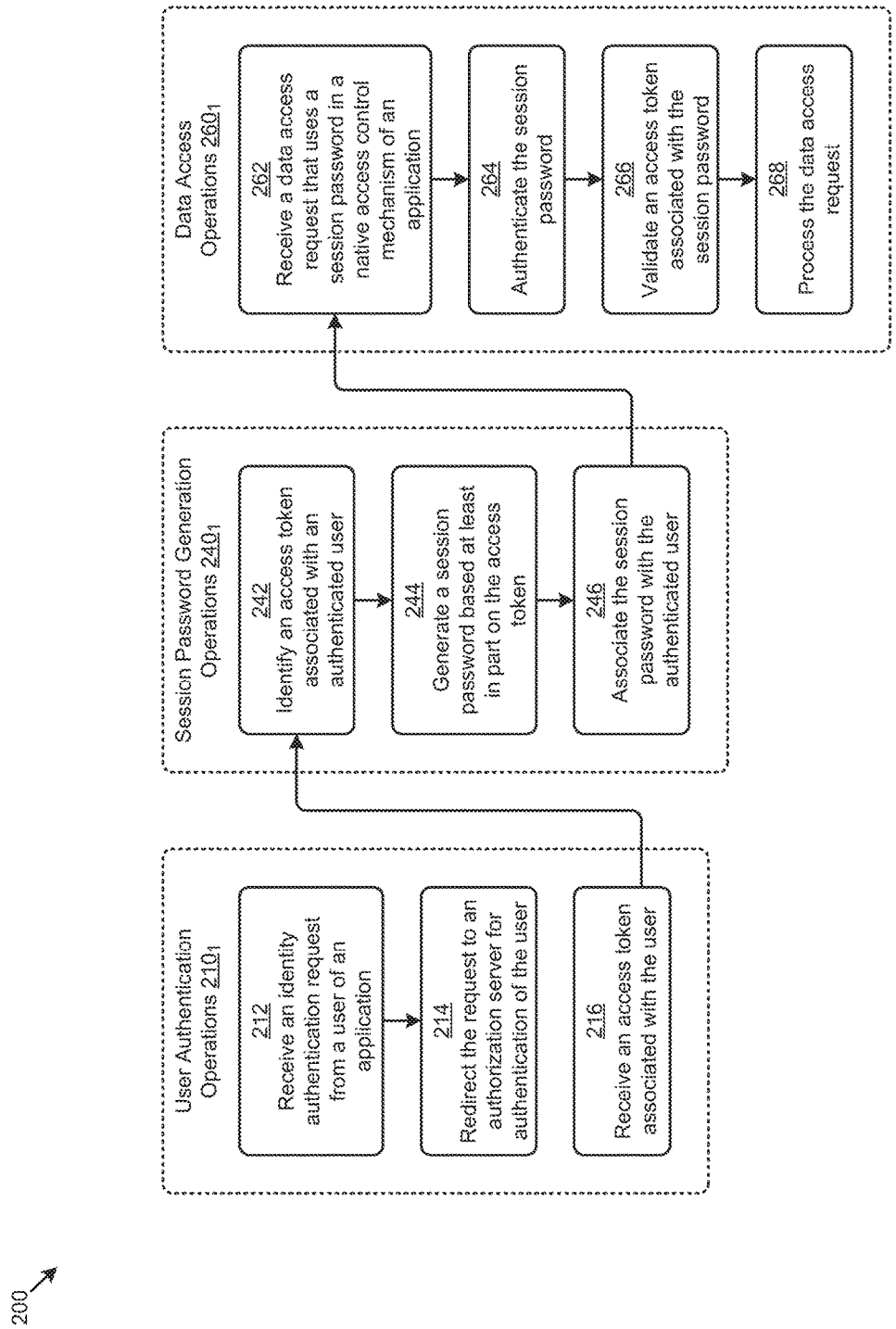
FIG. 2 depicts an application-agnostic resource access control technique as implemented in systems that facilitate secure access to resources by a plurality of applications using the native access control mechanisms of the applications, according to an embodiment.

FIG. 2 depicts an application-agnostic resource access control technique 200 as implemented in systems that facilitate secure access to resources by a plurality of applications using the native access control mechanisms of the applications. As an option, one or more variations of application-agnostic resource access control technique 200 or any aspect thereof may be implemented in the context of the architecture and functionality of the embodiments described herein. The application-agnostic resource access control technique 200 or any aspect thereof may be implemented in any environment.

The application-agnostic resource access control technique 200 presents one embodiment of certain steps and/or operations that facilitate secure access to resources by a plurality of applications using the native access control mechanisms of the applications. As shown, the steps and/or operations can be grouped in a set of user authentication operations $210_1$, a set of session password generation operations $240_1$, and a set of data access operations $260_1$.

As illustrated, user authentication operations $210_1$ can commence by receiving an identity authentication request from a user of an application (e.g., BI application, data analytics application, etc.) (step 212). The identity authentication request for the user is redirected to an authorization server (step 214). For example, the authorization server might be operated and/or controlled by a cloud storage provider and/or any other manager of protected resources (e.g., protected resources of data that is subjected for analysis). Responsive to the identity authentication request, an access token for the user is received (step 216).

The session password generation operations $240_1$ of the application-agnostic resource access control technique 200 can commence by identifying an access token associated with an authenticated user (step 242). For example, the authenticated user might be the user that issued the earlier mentioned identity authentication request. A session password is generated based at least in part on the received access token (step 244). In some cases, information comprising the access token might be used to reference other information (e.g., policy data) that is accessed to determine certain attributes (e.g., permissions) of the session password. The session password is then associated with the authenticated user (step 246).

The data access operations $260_1$ can commence by receiving a data access request that uses a session password, generated according to the herein disclosed techniques, in a native access control mechanism of an application (step 262). The session password received in the resource access request is authenticated to generate a session authentication result (step 264). The access token associated with the session password can also be validated (step 266). When the session password is authenticated and/or the access token is validated, the data access request is processed (step 268).

For example, a session authentication result produced in response to authenticating the session password might invoke an error response if the session authentication result is negative (e.g., session password authentication failed). If the session authentication result is positive (e.g., session password authentication succeeded), the processing of the data access request might, for example, comprise transforming one or more data statements from the data access request into one or more data operations that are executed over a set of subject data. As an example, the data statements might comprise at least one of, a data definition language statement, a data manipulation language statement, a data query, a transaction control statement, a session control statement, a system control statement, an embedded statement, or a set of structured programming code, or any combination therefrom.

One example scenario illustrating further details of the application-agnostic resource access control technique 200 and/or other herein disclosed techniques is presented as follows.

Figure 3A:
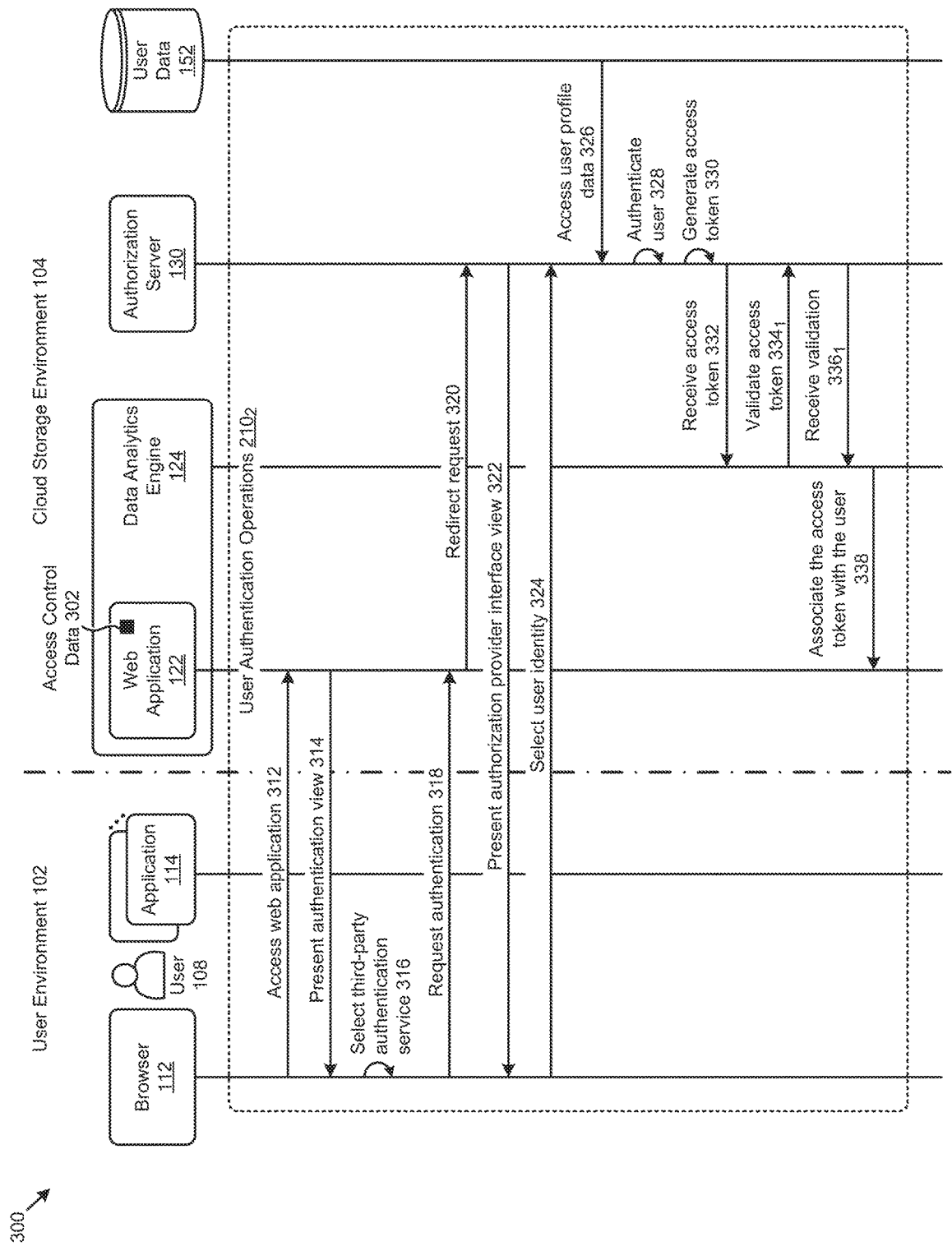
FIG. 3A, FIG. 3B, and FIG. 3C present a component-to-component interaction scenario that illustrates achieving secure access to resources by a plurality of applications using the native access control mechanisms of the applications, according to an embodiment.
Figure 3B:
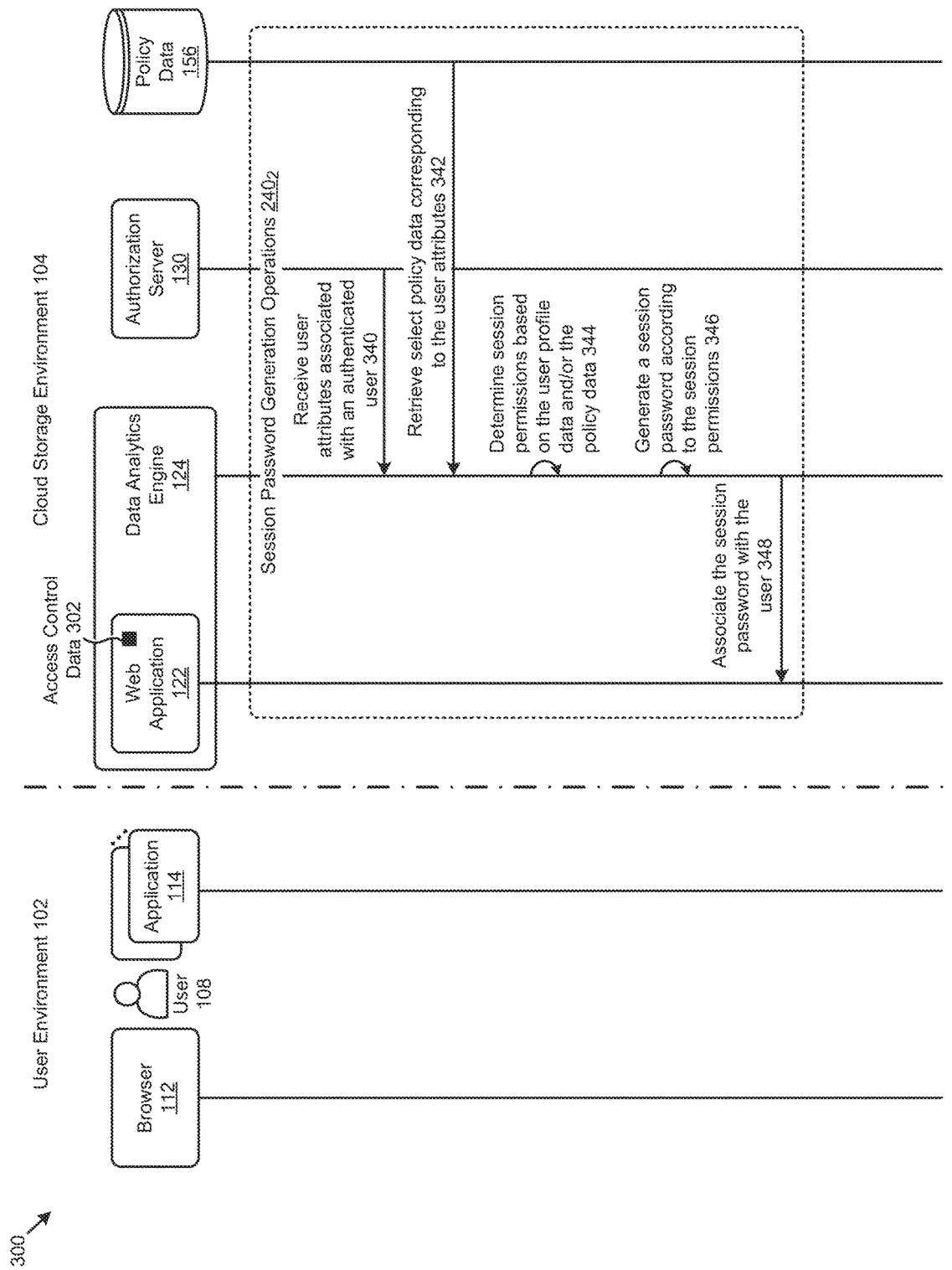
Figure 3C:
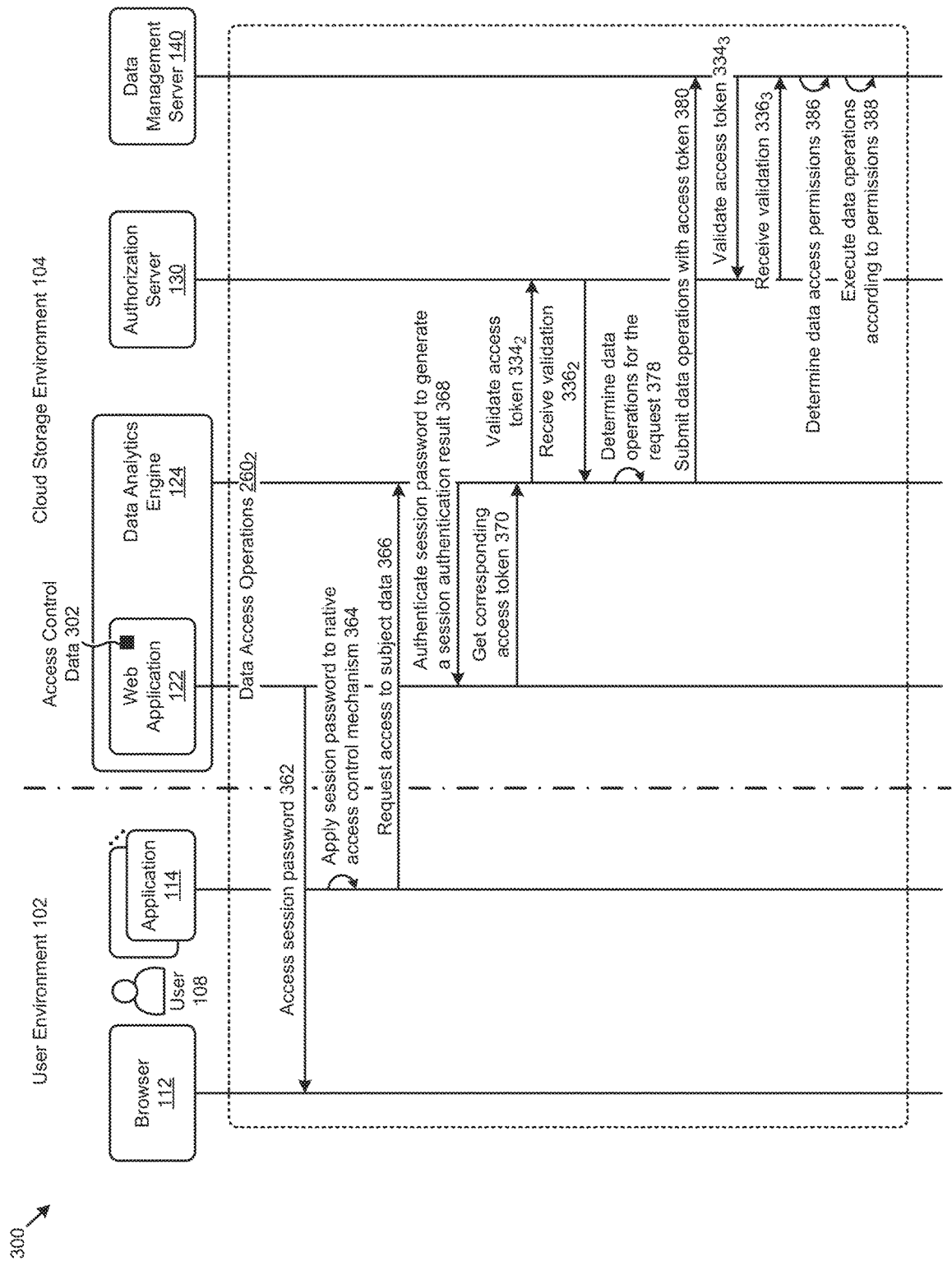

FIG. 3A, FIG. 3B, and FIG. 3C present a component-to-component interaction scenario 300 that illustrates achieving secure access to resources by a plurality of applications using the native access control mechanisms of the applications. As an option, one or more variations of component-to-component interaction scenario 300 or any aspect thereof may be implemented in the context of the architecture and functionality of the embodiments described herein. The component-to-component interaction scenario 300 or any aspect thereof may be implemented in any environment.

The component-to-component interaction scenario 300 presents certain components of user environment 102 and cloud storage environment 104 that can exhibit a set of high order interactions (e.g., operations, messages, etc.) to facilitate secure access to resources (e.g., subject data) by a plurality of applications (e.g., application 114) using the native access control mechanisms of the application in accordance with the herein disclosed techniques. Specifically referenced in the component-to-component interaction scenario 300 presented in FIG. 3A, FIG. 3B, and FIG. 3B are user 108, browser 112, and application 114 from user environment 102; and data analytics engine 124, web application 122, authorization server 130, data management server 140, user data 152, and policy data 156 from cloud storage environment 104.

As can be observed in FIG. 3A, a portion of the high order interactions of component-to-component interaction scenario 300 can comprise user authentication operations $210_2$. Specifically, user 108 can access web application 122 (message 312). For example, user 108 might access web application 122 by interacting with a user interface associated with web application 122 that is presented in browser 112. Web application 122 then presents an authentication view to user 108 at browser 112 (message 314). User 108 interacts with the authentication view to select a third-party authentication service (e.g., from a list of authentication services) (operation 316).

Selecting the authentication service invokes an authentication request at web application 122 (message 318). As an example, the authentication request might be invoked as part of a workflow for accessing a certain set of subject data for performing data analytics. The authentication request is redirected to authorization server 130 (message 320), which presents to browser 112 an authorization provider interface view to facilitate processing of the authentication request (message 322). User 108 then selects an identity to be authenticated from the authorization provider interface view (message 324). In this case, for example, the user might have already registered with the authorization provider, or, as another example, the user's identifying credentials have been made available to the authorization server by the owner of the resources (e.g., subject data) the user desires to access.

Authorization server 130 accesses certain user profile data from user data 152 (message 326) to facilitate authentication of the user (operation 328). For example, the authorization provider might access an associated access control list of registered users to authenticate the subject user. An access token is then generated for the authenticated user (operation 330). Data analytics engine 124 receives the access token from authorization server 130 (message 332) and validates the access token with authorization server 130 (message $334_1$). For example, the data analytics engine might validate that the access token is authorized for use by the data analytics engine. When validation of the access token is received (message $336_1$), the access token is associated with the authenticated user (e.g., user 108) at the data analytics engine 124 (message 338). As an example, user 108 and a corresponding access token might be associated in a set of access control data 302 that can be accessed by web application 122 and/or data analytics engine 124.

Referring to FIG. 3B, a portion of the high order interactions of component-to-component interaction scenario 300 can comprise session password generation operations $240_2$. Specifically, certain user attributes associated with an authenticated user can be received at data analytics engine 124 (message 340). For example, the select user attributes (e.g., role, enterprise, location, etc.) might be delivered to data analytics engine 124 by authorization server 130 with the delivery of an access token for the user. Based on the received user attributes, a set of policy data corresponding to the user attributes are retrieved from policy data 156 (message 342). A set of session permissions (e.g., permissions for a particular role, enterprise, location, etc.) are determined based at least in part on the user attributes and/or the selected policy data (operation 344). A session password is then generated in accordance with the session permissions (operation 346). The session password is then associated with the authenticated user (e.g., user 108) at data analytics engine 124 (message 348). As an example, user 108 and a corresponding session password might be associated in a set of access control data 302 accessible by web application 122 and/or data analytics engine 124.

Referring to FIG. 3C, a portion of the high order interactions of component-to-component interaction scenario 300 can comprise data access operations $260_2$. Specifically, user 108 might access an assigned session password at web application 122 (e.g., in access control data 302) using browser 112 (message 362). The session password is applied to (e.g., entered into) a native access control mechanism of application 114 (operation 364). A request for access to subject data can then be submitted from application 114 to data analytics engine 124 (message 366).

The data analytics engine 124 authenticates the session password to generate a session authentication result (message 368). Data analytics engine 124 might authenticate the session password by, for example, looking up the session password in access control data 302. The session authentication result produced in response to authenticating the session password might invoke an error response if the session authentication result is negative (e.g., session password authentication failed). If the session authentication result is positive (e.g., session password authentication succeeded), the access token associated with the session password (and associated user) is retrieved (message 370). Authorization server 130 is accessed by the data analytics engine 124 to validate the access token (message 334$_2$). If the access token is valid, the authorization server 130 will return some indication of validity to data analytics engine 124 (message 336$_2$).

With an authenticated session password and a validated access token, a set of data operations to carry out the data access request is determined by the data analytics engine 124 (operation 378). In some cases, the data operations can be constrained by a set of session permissions associated with the session password generated for the user that issued the data access request. The data operations are submitted with the access token to the data management server 140 (operation 380). Data management server 140 validates the access token with authorization server 130 (message 334$_3$). If the access token is valid, an indication of validation is received at data management server 140 (message 336$_3$). Data management server 140 can then determine the data access permissions associated with the access token (operation 386) to facilitate execution of the data operations (e.g., over a set of subject data) (operation 388).

The foregoing discusses an access control data structure (e.g., access control data 302) that associates users, access tokens, session passwords, and/or other attributes. One embodiment of such a data structure is described in further detail as follows.

Figure 4:
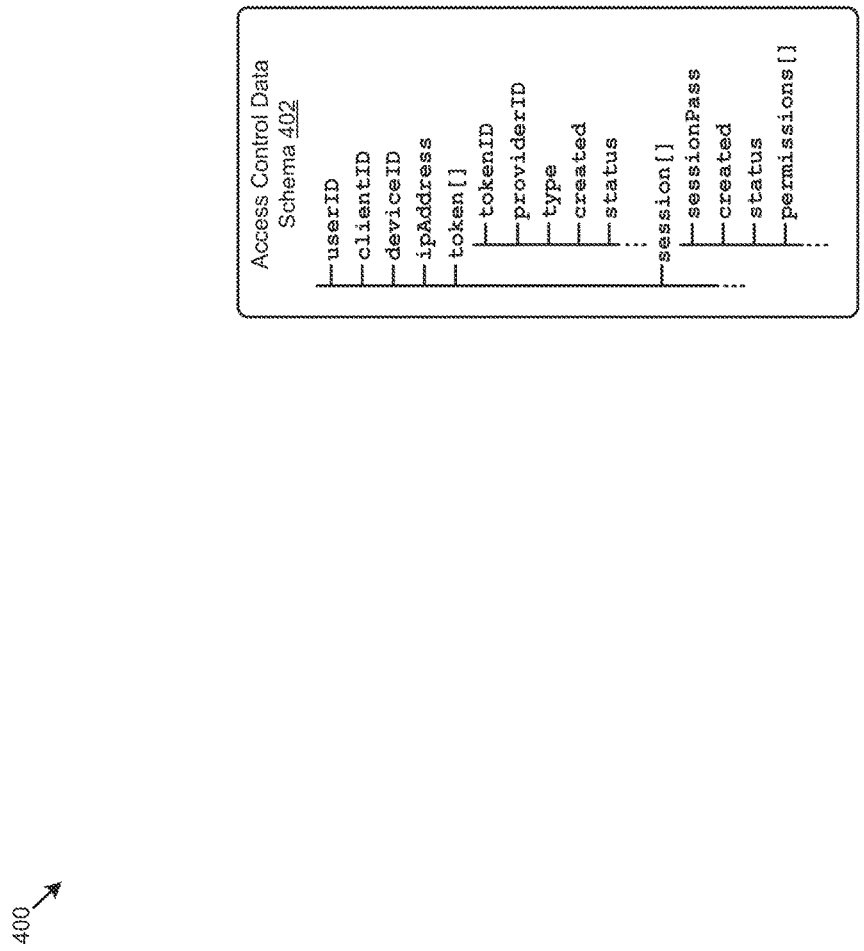
FIG. 4 depicts a specialized data structure that is designed to improve the way a computer stores and retrieves data in memory when performing operations that facilitate secure access to resources by a plurality of applications using the native access control mechanisms of the applications, according to an embodiment.

FIG. 4 depicts a specialized data structure 400 that is designed to improve the way a computer stores and retrieves data in memory when performing operations that facilitate secure access to resources by a plurality of applications using the native access control mechanisms of the applications. As an option, one or more variations of specialized data structure 400 or any aspect thereof may be implemented in the context of the architecture and functionality of the embodiments described herein. The specialized data structure 400 or any aspect thereof may be implemented in any environment.

The information (e.g., attributes) associated with users, access tokens, session passwords, and/or other entities described herein can be organized and/or stored using various techniques. For example, access control data schema 402 indicates the data used for access control by the herein disclosed techniques might be organized and/or stored in a tabular structure (e.g., relational database table) that has rows corresponding to a particular user and columns corresponding to various access control attributes of the user.

As another example, the data used for access control can be organized and/or stored in a programming code object that has instances corresponding to a particular user and properties corresponding to the various attributes pertaining to the user. As depicted in access control data schema 402, a data record (e.g., table row or object instance) for a particular user might describe a user identifier (e.g., stored in a "userID" field), a client identifier (e.g., stored in a "clientID" field), a device identifier (e.g., stored in a "deviceID" field), an IP address (e.g., stored in an "ipAddress" field), a set of access token attributes (e.g., stored in a "token[ ]" object), a set of session attributes (e.g., stored in a "session[ ]" object), and/or other related attributes.

As can be observed, the access token attributes can comprise a token identifier (e.g., store in a "tokenID" field), an access token provider identifier (e.g., stored in a "providerID" field), an access token type (e.g., stored in a "type" field), a timestamp corresponding to when the access token is created (e.g., stored in a "created" field), a status indicator (e.g., stored in a "status" field), and/or other access token attributes. Further, the session attributes can comprise a session password (e.g., stored in a "sessionPass" field), a timestamp corresponding to when the access token is created (e.g., stored in a "created" field), a status indicator (e.g., stored in a "status" field), a list of permissions associated with the session and/or session password (e.g., stored in a "permissions[ ]" object), and/or other session attributes.

The foregoing discussion describes user interactions with systems that implement the herein disclosed techniques. The following representative user interfaces facilitate further detailed discussion of such user interactions.

Figure 5A:
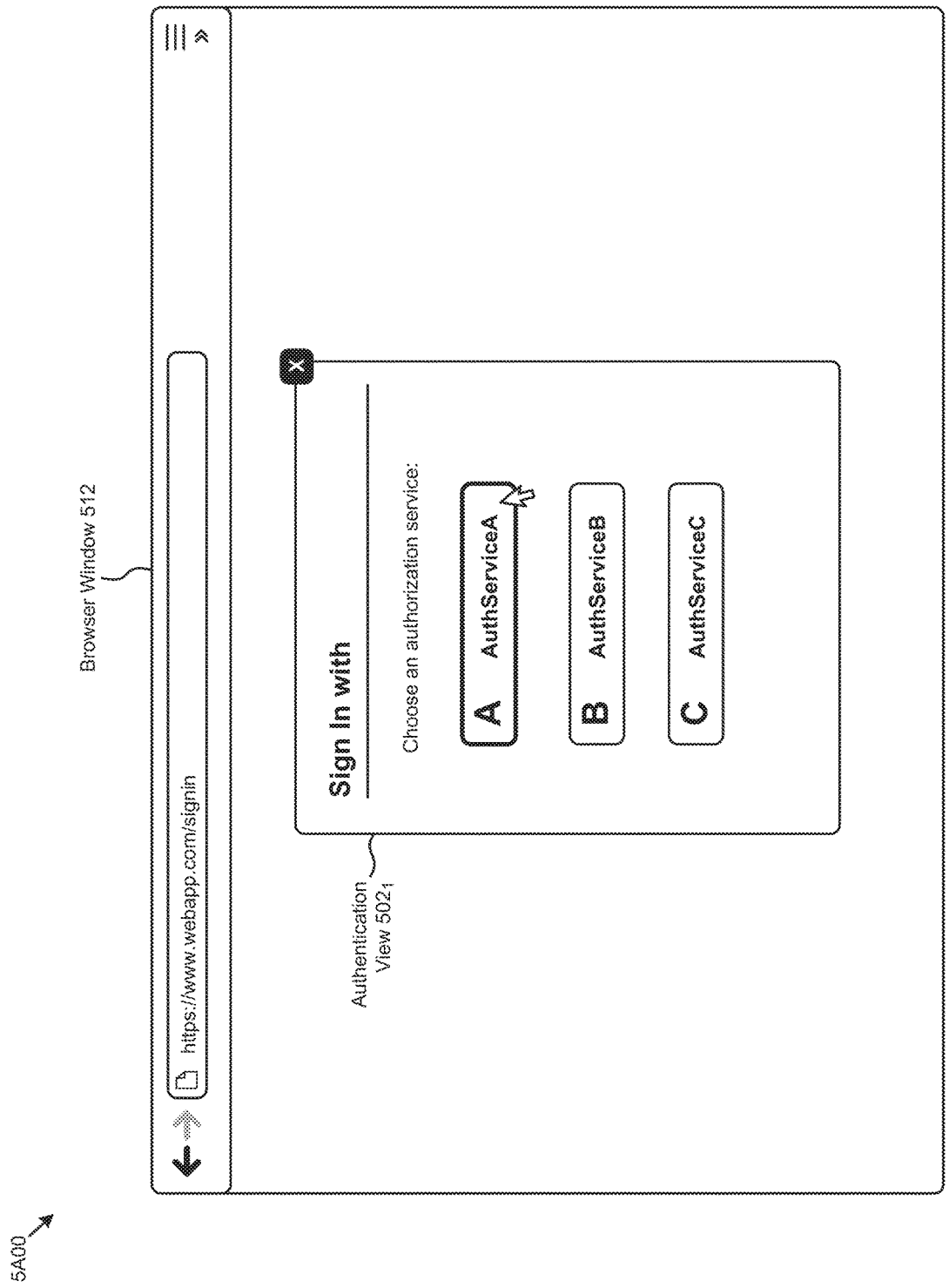
FIG. 5A illustrates an authorization service selection interface as implemented in systems that facilitate secure access to resources by a plurality of applications using the native access control mechanisms of the applications, according to an embodiment.

FIG. 5A illustrates an authorization service selection interface 5A00 as implemented in systems that facilitate secure access to resources by a plurality of applications using the native access control mechanisms of the applications. As an option, one or more variations of authorization service selection interface 5A00 or any aspect thereof may be implemented in the context of the architecture and functionality of the embodiments described herein. The authorization service selection interface 5A00 or any aspect thereof may be implemented in any environment.

The embodiment shown in FIG. 5A is merely one example. As shown, the authorization service selection interface 5A00 presents certain authorization service options to authenticate the user. Specifically, three options (e.g., "AuthServiceA", "AuthServiceB", and "AuthServiceC") are presented to a user in an authentication view 502$_1$ that is rendered in a browser window 512. As can be observed, the user might select "AuthServiceA" as the authorization service. For example, the "AuthServiceA" entity might be a cloud storage provider (e.g., Google) that performs identity provider ("IdP") or identity assertion provider services.

Figure 5B:
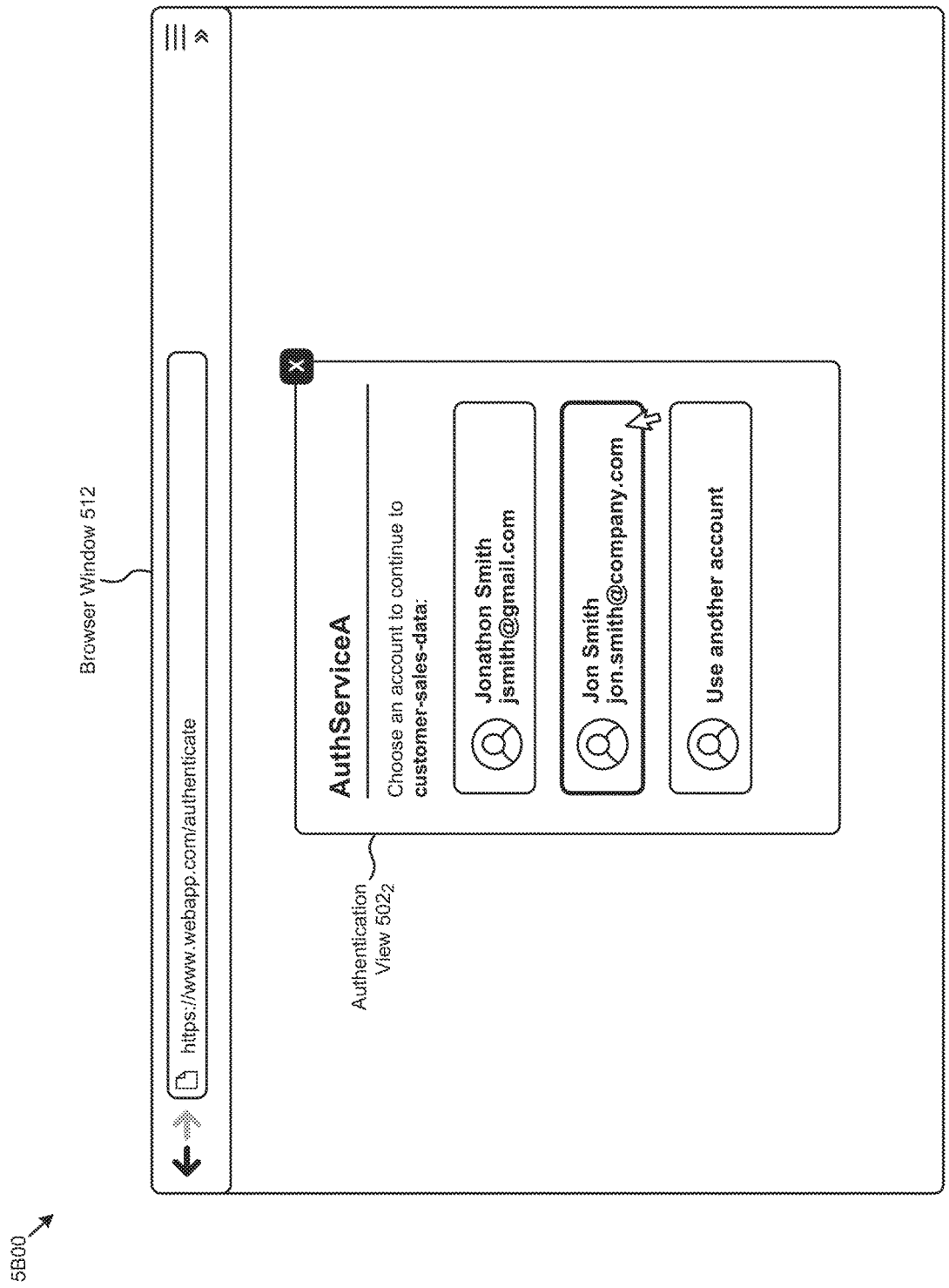
FIG. 5B illustrates a user account selection interface as implemented in systems that facilitate secure access to resources by a plurality of applications using the native access control mechanisms of the applications, according to an embodiment.

FIG. 5B illustrates a user account selection interface 5B00 as implemented in systems that facilitate secure access to resources by a plurality of applications using the native access control mechanisms of the applications. As an option, one or more variations of user account selection interface 5B00 or any aspect thereof may be implemented in the context of the architecture and functionality of the embodiments described herein. The user account selection interface 5B00 or any aspect thereof may be implemented in any environment.

The embodiment shown in FIG. 5B is merely one example. As shown, the user account selection interface 5B00 presents to a user certain options for authenticating the identity of the user at an "AuthServiceA" authorization service. Specifically, two account options (e.g., distinguished by email address) are presented to a user in an authentication view 502$_2$ that is rendered in browser window 512. As can be observed, either account can facilitate access to a set of subject data identified as "customer-sales-data".

Figure 6:
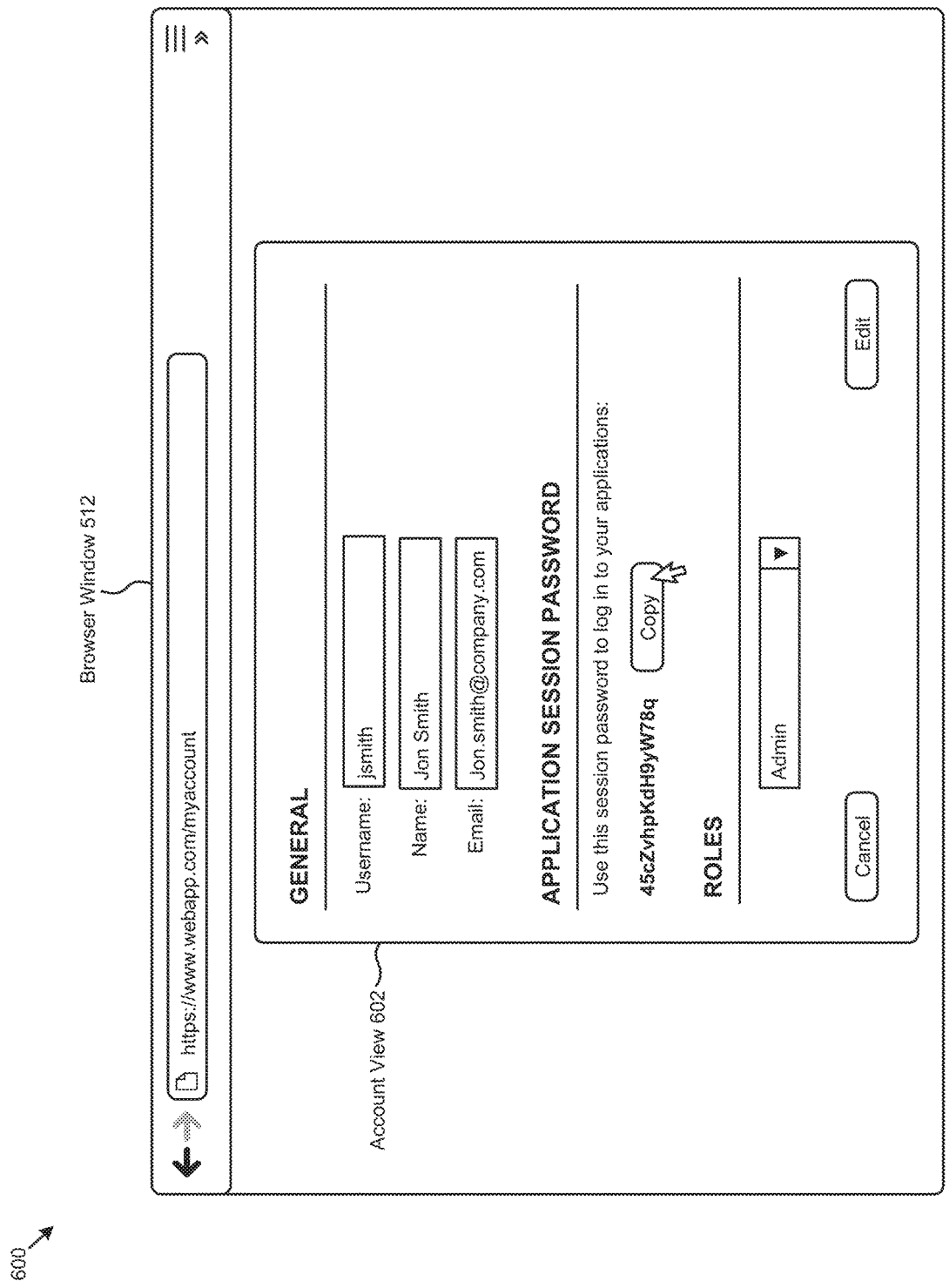
FIG. 6 illustrates a session password presentation interface as implemented in systems that facilitate secure access to resources by a plurality of applications using the native access control mechanisms of the applications, according to an embodiment.

FIG. 6 illustrates a session password presentation interface 600 as implemented in systems that facilitate secure access to resources by a plurality of applications using the native access control mechanisms of the applications. As an option, one or more variations of session password presentation interface 600 or any aspect thereof may be implemented in the context of the architecture and functionality of the embodiments described herein. The session password presentation interface 600 or any aspect thereof may be implemented in any environment.

The embodiment shown in FIG. 6 is merely one example. As shown, the session password presentation interface 600 visually presents an application session password (e.g., "45cZvhpKdH9yW78q") to a user. Specifically, the session password is presented in an account view 602 that is rendered in browser window 512. In certain embodiments, the session password is associated with the user in a data structure (e.g., storing user access control data) that is accessible by the web application that rendered account view 602. As further shown, an option to copy the session password to the clipboard is available to, for example, paste the session password into a password field presented by a native access control mechanism of an application (e.g., a BI application that serves to process business intelligence information). Such a scenario is disclosed as follows.

Figure 7:
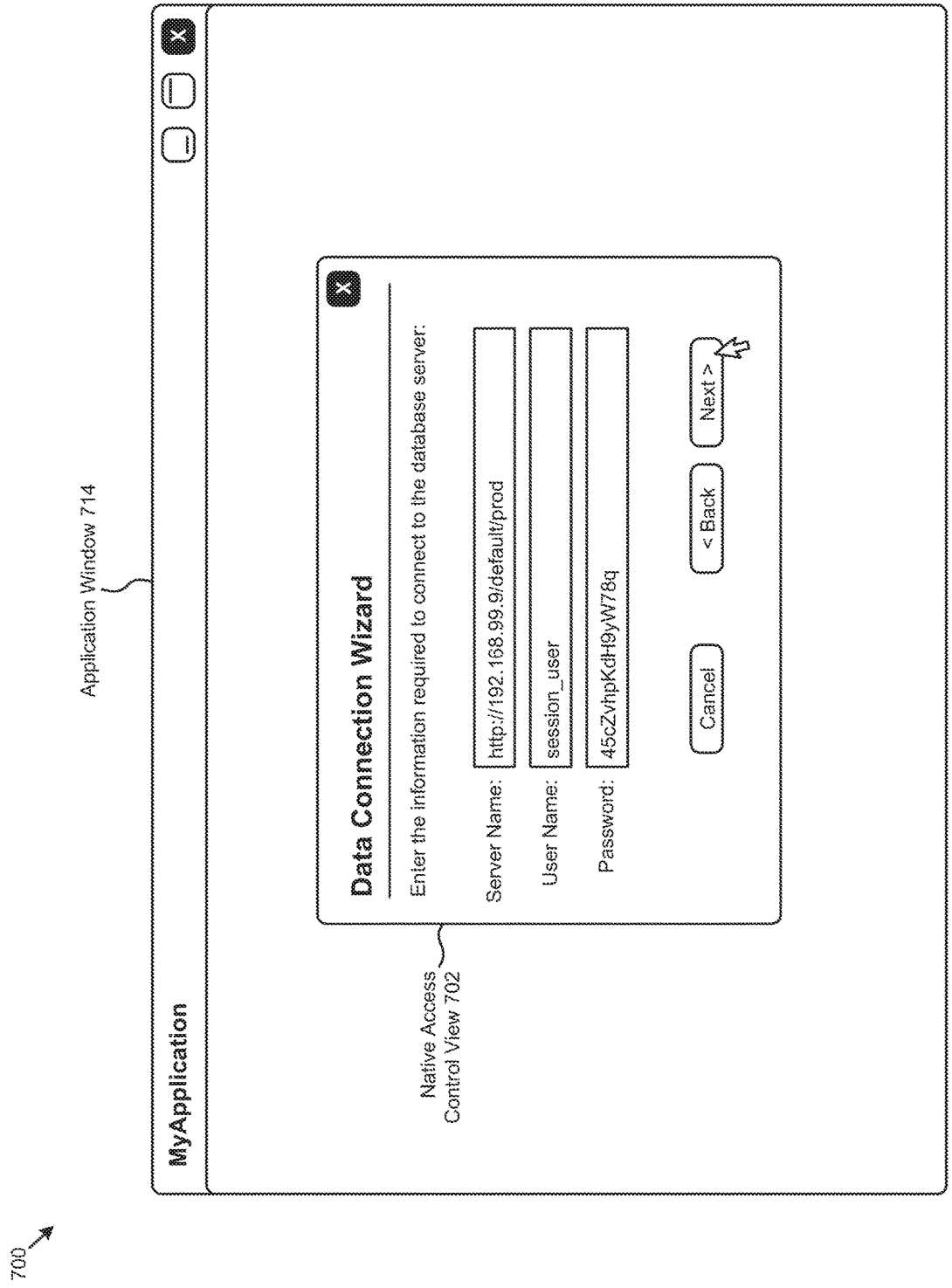
FIG. 7 illustrates a native application access control interface as used with systems that facilitate secure access to resources by a plurality of applications using the native access control mechanisms of the applications, according to an embodiment.

FIG. 7 illustrates a native application access control interface 700 as used with systems that facilitate secure access to resources by a plurality of applications using the native access control mechanisms of the applications. As an option, one or more variations of native application access control interface 700 or any aspect thereof may be implemented in the context of the architecture and functionality of the embodiments described herein. The native application access control interface 700 or any aspect thereof may be implemented in any environment.

The embodiment shown in FIG. 7 is merely one example. As shown, a native access control view 702 of an application "MyApplication" is presented as a "Data Connection Wizard" to a user (e.g., an authenticated user) in an application window 714. The user enters a "Server Name" (e.g., learned from training, published documentation, etc.), a "User Name" (e.g., a non-personally identifiable user name used for session access), and a "Password". According to the herein disclosed techniques, the "Password" will be the session password earlier generated and presented to the user.

Additional Embodiments of the Disclosure

Additional Practical Application Examples

Figure 8:
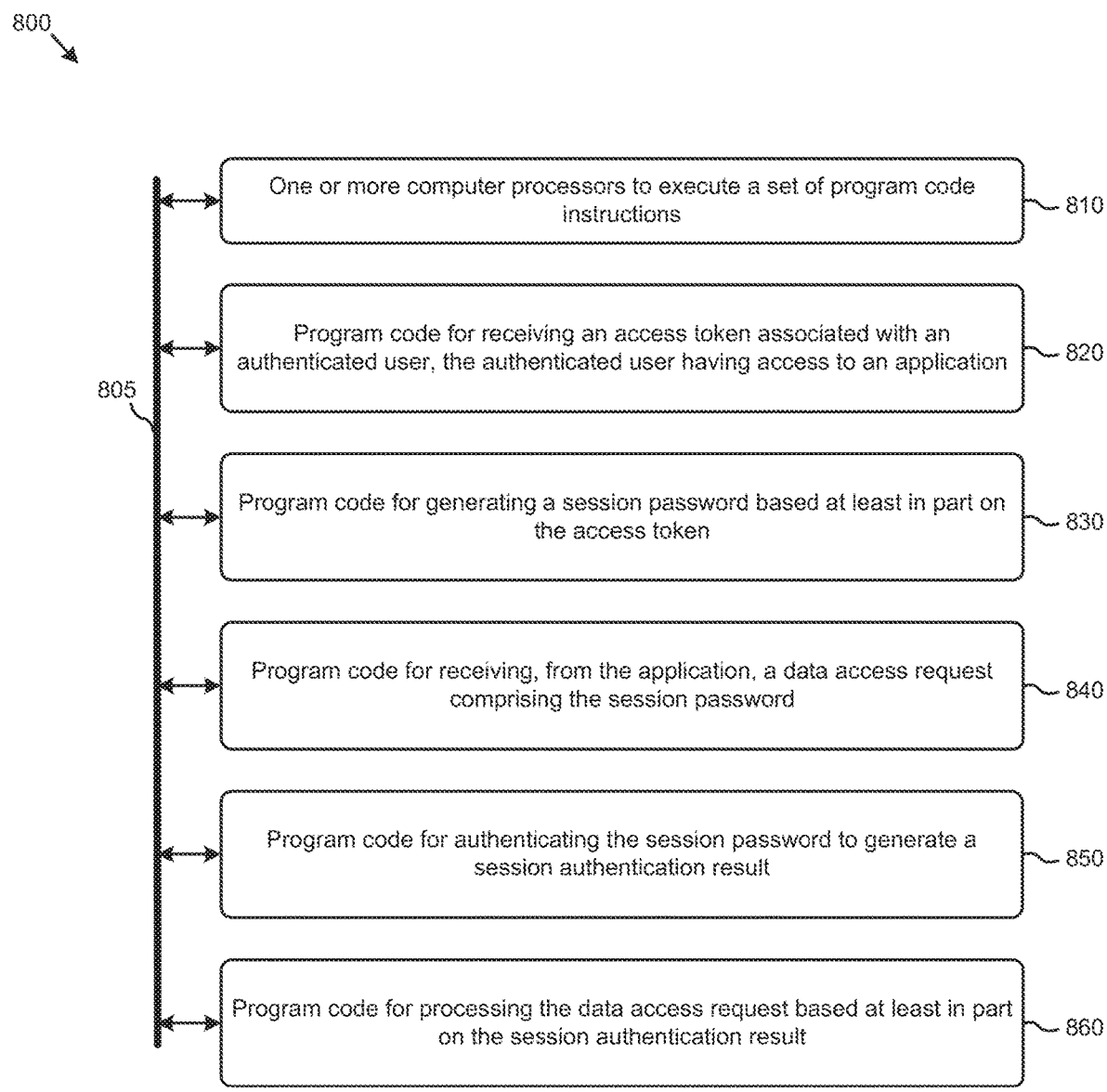
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising a computer processor to execute a set of program code instructions (module 810) and modules for accessing memory to hold program code instructions to perform: receiving an access token associated with an authenticated user, the authenticated user having access to an application (module 820); generating a session password based at least in part on the access token (module 830); receiving, from the application, a data access request comprising the session password (module 840); authenticating the session password to generate a session authentication result (module 850); and processing the data access request based at least in part on the session authentication result (module 860).

Variations of the foregoing may include more or fewer of the shown modules. Certain variations may perform more or fewer (or different) steps, and/or certain variations may use data elements in more, or in fewer (or different) operations. For example, in exemplary embodiments, the operations pertaining to processing data access requests are performed by providing the session authentication result to a particular application 114 without modifying the native access control mechanism of the particular application.

System Architecture Overview

Additional System Architecture Examples

Figure 9A:
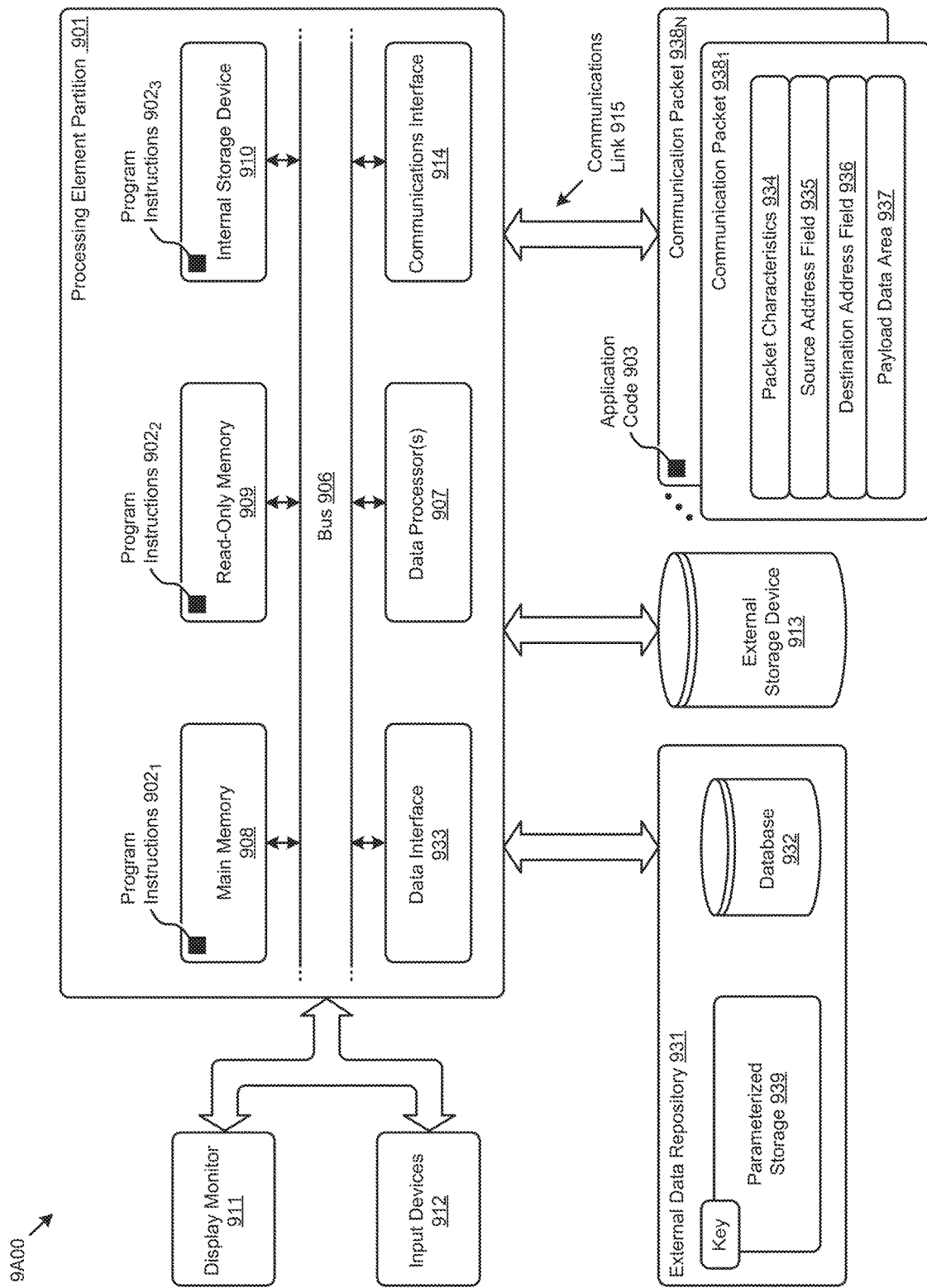
FIG. 9A and FIG. 9B present block diagrams of computer system architectures having components suitable for implementing embodiments of the present disclosure and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a CPU, or a multi-core CPU (e.g., data processor 907), a system memory (e.g., main memory 908, or an area of random access memory (RAM)), a non-volatile storage device or non-volatile storage area (e.g., read-only memory or ROM 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. The shown computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communications packet $938_1$, communications packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). A module may include one or more state machines and/or combinational logic used to implement or facilitate the operational and/or performance characteristics pertaining to data access authorization for dynamically generated database structures.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of data access authorization for dynamically generated database structures). Such files or records can be brought into and/or stored in volatile or non-volatile memory.

Figure 9B:
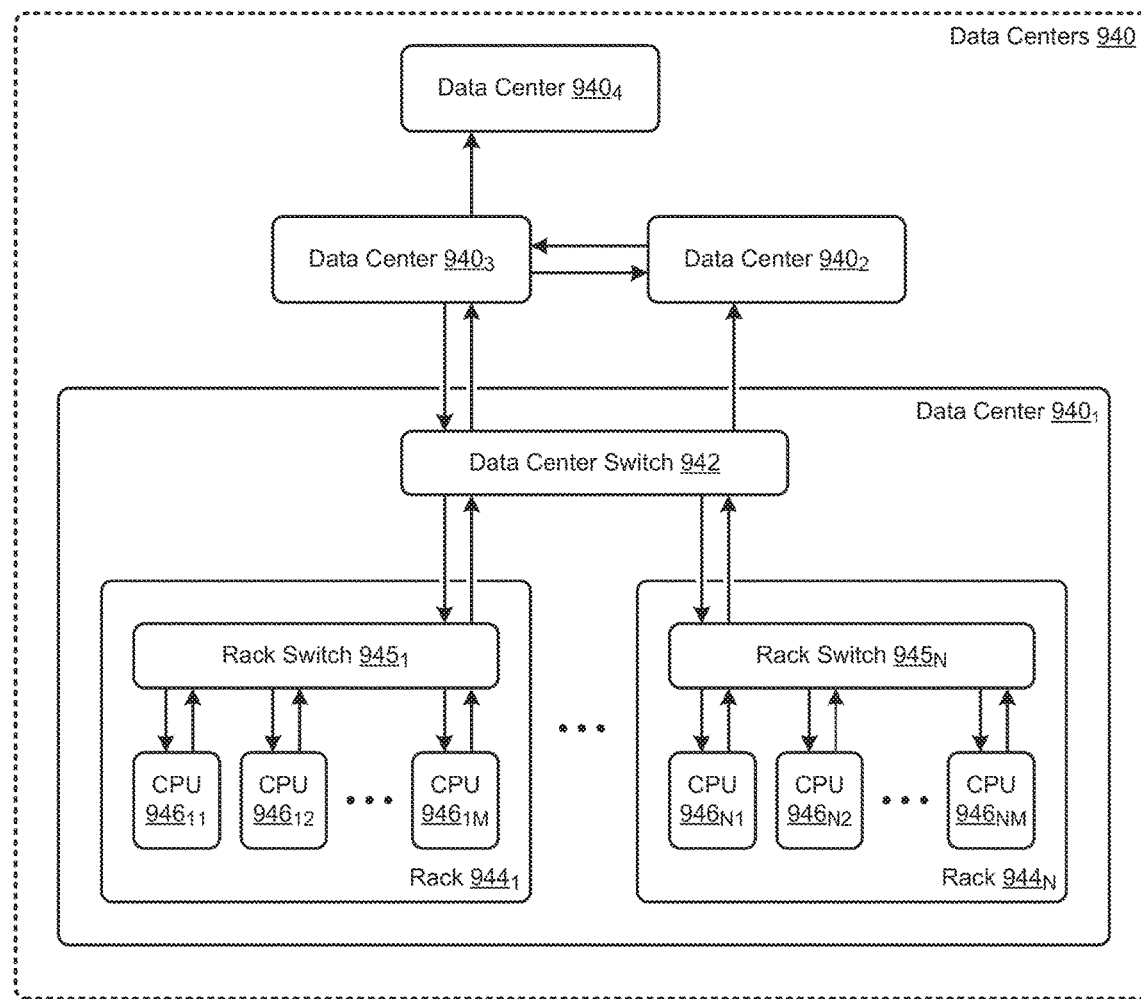

FIG. 9B depicts a block diagram of an instance of a distributed data processing system 9B00 that may be included in a system implementing instances of the herein-disclosed embodiments.

Distributed data processing system 9B00 can include many more or fewer components than those shown. Distributed data processing system 9B00 can be used to store data, perform computational tasks, and/or transmit data between a plurality of data centers 940 (e.g., data center $940_1$, data center $940_2$, data center $940_3$, and data center $940_4$). Distributed data processing system 9B00 can include any number of data centers. Some of the plurality of data centers 940 might be located geographically close to each other, while others might be located far from the other data centers.

The components of distributed data processing system 9B00 can communicate using dedicated optical links and/or other dedicated communication channels, and/or supporting hardware such as modems, bridges, routers, switches, wireless antennas, wireless towers, and/or other hardware components. In some embodiments, the component interconnections of distributed data processing system 9B00 can include one or more wide area networks (WANs), one or more local area networks (LANs), and/or any combination of the foregoing networks. In certain embodiments, the component interconnections of distributed data processing system 9B00 can comprise a private network designed and/or operated for use by a particular enterprise, company, customer, and/or other entity. In other embodiments, a public network might comprise a portion or all of the component interconnections of distributed data processing system 9B00.

In some embodiments, each data center can include multiple racks that each include frames and/or cabinets into which computing devices can be mounted. For example, as shown, data center $940_1$ can include a plurality of racks (e.g., rack $944_1$, ..., rack $944_N$), each comprising one or more computing devices. More specifically, rack $944_1$ can include a first plurality of CPUs (e.g., CPU $946_{11}$, CPU $946_{12}$, ..., CPU $946_{1M}$), and rack $944_N$ can include an Nth plurality of CPUs (e.g., CPU $946_{N1}$, CPU $946_{N2}$, ..., CPU $946_{NM}$). The plurality of CPUs can include data processors, network attached storage devices, and/or other computer controlled devices. In some embodiments, at least one of the plurality of CPUs can operate as a master processor, controlling certain aspects of the tasks performed throughout the distributed data processing system 9B00. For example, such master processor control functions might pertain to scheduling, data distribution, and/or other processing operations associated with the tasks performed throughout the distributed data processing system 9B00. In some embodiments, one or more of the plurality of CPUs may take on one or more roles, such as a master and/or a slave. One or more of the plurality of racks can further include storage (e.g., one or more network attached disks) that can be shared by one or more of the CPUs.

In some embodiments, the CPUs within a respective rack can be interconnected by a rack switch. For example, the CPUs in rack $944_1$ can be interconnected by a rack switch $945_1$. As another example, the CPUs in rack $944_N$ can be interconnected by a rack switch $945_N$. Further, the plurality of racks within data center $940_1$ can be interconnected by a data center switch 942. Distributed data processing system 9B00 can be implemented using other arrangements and/or partitioning of multiple interconnected processors, racks, and/or switches. For example, in some embodiments, the plurality of CPUs can be replaced by a single large-scale multiprocessor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    receiving an access token associated with an authenticated user, the authenticated user having access to a set of applications that operate on a set of subject data;
    generating a session password based on a set of session permissions assigned to the authenticated user, the session password associated with the received access token, the session permissions indicative of the set of subject data accessible by a request;
    receiving, from a first application in the set of applications, the request to access the set of subject data, the request including the session password, the session password traversing a network connection with the request;
    via the session password, obtaining the access token associated with the authenticated user, the access token remaining behind a network security boundary defining the set of subject data; and
    in response to determining that the obtained access token associated with the session password is valid, providing the first application access to the set of subject data for performing analytics using the obtained access token based on the access afforded by the session permissions, the set of subject data further comprising files and records accessible by keys in query clauses.

2. The method of claim 1, wherein the request is issued from a native access control mechanism of the first application.

3. The method of claim 2 further comprising:
    processing the request by providing a session result set to the first application of the set of applications without modifying the native access control mechanism of the first application.

4. The method of claim 1, wherein the request is a first data access request, the method further comprising:
    from a second application in the set of applications, receiving a second request to access the set of subject data, the second request including the session password.

5. The method of claim 1, further comprising:
    receiving an identity authentication request from the authenticated user; and
    redirecting the identity authentication request to an authorization server.

6. The method of claim 1, wherein the session password is presented to the authenticated user at a user interface of a web application.

7. The method of claim 1, wherein an association between at least two of, the authenticated user, the access token, or the session password is codified in a specialized data structure.

8. The method as in claim 1 further comprising:
    via an authentication server, authenticating the obtained access token associated with the authenticated user, authentication of the obtained access token providing the first application access to the set of subject data.

9. The method as in claim 1 further comprising:
    accessing policy data based on a received set of user attributes associated with the authenticated user; and
    deriving the set of session permissions from the set of user attributes and the accessed policy data.

10. The method as in claim 1 further comprising:
    receiving an identity authentication request associated with the user; and
    via an authorization server, authenticating the user as specified by the identity authentication request.

11. The method as in claim 1 further comprising:
    producing access control data associated with the authenticated user, the access control data including a reference to the access token.

12. The method as in claim 11 further comprising:
    producing the access control data associated with the authenticated user to include the session password.

13. The method as in claim 12 further comprising:
    utilizing the access control data to obtain the access token associated with the authenticated user.

14. The method as in claim 1 further comprising:
    obtaining the access token associated with the authenticated user via use of access control data associating the session password to the access token.

15. The method of claim 1 wherein the network connection includes the network security boundary.

16. Computer readable hardware storage media having stored thereon a sequence of instructions which, when executed by processor hardware, causes the processor hardware to:

receive an access token associated with an authenticated user, the authenticated user having access to one or more applications that operate on a set of subject data;

generate a session password based on a set of session permissions assigned to the authenticated user, the session password associated with the received access token, the session permissions indicative of the set of subject data accessible by a data access request;

provide the session password to the authenticated user;

receive, from an application executed by the authenticated user, the data access request, the data access request including the session password and the session password traversing a network connection with the data access request;

via the session password, obtain the access token associated with the authenticated user, the access token remaining behind a network security boundary defining the set of subject data; and in response to determining that the access token associated with the session password is valid, execute the data access request received from the application executed by the authenticated user for performing analytics on the subject data based on the access afforded by the session permissions, the set of subject data further comprising files and records accessible by keys in query clauses.

17. The computer readable hardware storage media of claim 16, wherein the data access request is issued from a native access control mechanism of the application executed by the user.

18. The computer readable hardware storage media of claim 16, wherein a first data access request comprising the session password is received from a first application from the one or more applications, and a second data access request comprising the session password is received from a second application from the one or more applications.

19. The computer readable hardware storage media of claim 16, wherein the processor hardware is further operative to:

receive an identity authentication request from the authenticated user; and direct the identity authentication request to an authorization server.

20. The computer readable hardware storage media of claim 16, wherein the session password is presented to the authenticated user at a user interface of a web application.

21. A system comprising:

hardware storage media having stored thereon a sequence of instructions; and processor hardware that executes the instructions, causing the processor hardware to:

receive an access token associated with an authenticated user, the authenticated user having access to a set of applications that operate on a set of subject data;

generate a session password based on a set of session permissions assigned to the authenticated user, the session password associated with the received access token, the session permissions indicative of the set of subject data accessible by a request;

receive, from a first application in the set of applications, the request to access the set of subject data, the request including the session password, the session password traversing a network connection with the request;

via the session password, obtain the access token associated with the authenticated user, the access token remaining behind a network security boundary defining the set of subject data; and in response to determining that the obtained access token associated with the session password is valid, provide the first application access to the set of subject data for performing analytics using the obtained access token based on the access afforded by the session permissions, the set of subject data further comprising files and records accessible by keys in query clauses.

22. The system of claim 21, wherein the request is issued from a native access control mechanism of the set of applications.

23. The system of claim 22, wherein processing of the request is performed by providing a session result set to the first application in the set of applications without modifying the native access control mechanism of the first application.

24. A method comprising:

validating a received access token with an authorization server;

associating the access token with a user in a set of access control data;

accessing policy data based on a set of user attributes associated with the user to determine a set of session permissions, the session permissions indicative of a set of subject data accessible by a data access request;

generating a session password based on the set of session permissions;

in the set of access control data, associating the session password with the user;

receiving the data access request from an application, the data access request generated to operate on the set of subject data, the session password traversing a network connection with the data access request;

looking up the session password in the set of access control data;

via the look up of the session password, retrieving the access token associated with the session password, the access token remaining behind a network security boundary defining the set of subject data;

at the authorization server, determining that the access token associated with the session password is valid;

responsive to detecting that the obtained access token associated with the session password is valid, determining a set of data operations from data statements included in the data access request, the set of data operations constrained by the set of session permissions associated with the session password generated for the user based on the access afforded by the session permissions;

submitting the set of data operations with the access token to a data management server for execution, the data operations applied to the set of subject data for performing analytics;

receiving a result set from the data management server, the result set generated from applying the set of data operations to the set of subject data, the set of subject data further comprising files and records accessible by keys in query clauses; and returning the result set to the application.

25. The method as in claim 24 further comprising:
receiving an identity authentication request from the user of the application;
directing the identity authentication request from the user to an authorization server; and
responsive to the identity authentication request, receiving the access token and a set of user attributes assigned to the user.

* * * * *